(12) United States Patent
Arbuckle et al.

(10) Patent No.: US 7,857,527 B2
(45) Date of Patent: Dec. 28, 2010

(54) HINGED CAMERA SLED

(75) Inventors: James F. Arbuckle, Clovis, CA (US);
Brook H. Cavalla, Clovis, CA (US);
William L. Forman, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 140 days.

(21) Appl. No.: 12/210,068

(22) Filed: Sep. 12, 2008

(65) Prior Publication Data

US 2010/0067894 A1 Mar. 18, 2010

(51) Int. Cl.
*G03B 17/00* (2006.01)
(52) U.S. Cl. ..................................... 396/428
(58) Field of Classification Search .......... 396/427–428
See application file for complete search history.

(56) References Cited

U.S. PATENT DOCUMENTS

| | | | |
|---|---|---|---|
| 4,963,904 A | 10/1990 | Lee | |
| 4,999,885 A | 3/1991 | Lee | |
| D323,668 S | * 2/1992 | Schwartz et al. | D16/242 |
| 6,375,369 B1 | * 4/2002 | Schneider et al. | 396/427 |
| 6,561,702 B1 | * 5/2003 | Yik | 396/420 |
| 6,992,723 B1 | * 1/2006 | Wulf et al. | 348/374 |
| 7,570,301 B2 | * 8/2009 | Gilor | 348/373 |
| 7,661,535 B2 | * 2/2010 | Law | 206/578 |
| 2003/0053806 A1 | * 3/2003 | Schneider | 396/427 |
| 2006/0239677 A1 | * 10/2006 | Friedrich | 396/419 |

* cited by examiner

*Primary Examiner*—W. B. Perkey
*Assistant Examiner*—Dennis Hancock
(74) *Attorney, Agent, or Firm*—Paul T. Kashimba, Esq.

(57) ABSTRACT

Embodiments of the present invention provide systems, methods and apparatus for supporting and easily adjusting the position of a surveillance camera in an enclosure. Embodiments of the present invention also provide systems, methods and apparatus for keeping the front panel of a camera enclosure clear during cold temperature periods. Finally, embodiments of the present invention provide systems, methods and apparatus for the efficient transfer of heat out of a camera enclosure during warm temperatures.

15 Claims, 7 Drawing Sheets

HINGED CAMERA SLED

BACKGROUND OF THE INVENTION

1. Field of the Invention

The present invention relates to surveillance camera systems, and more particularly to methods and apparatus for supporting a surveillance camera inside an enclosure, as well as methods and apparatus for controlling the temperature inside such an enclosure.

2. Description of the Prior Art

The use of surveillance cameras and related systems is becoming increasingly more prevalent. Not only are surveillance cameras used in such traditional institutions as banks and casinos, but their use has spread to retail and business establishments, indoor and outdoor entry points, airport security checkpoints, government buildings, parking lots, and the like.

In the field of surveillance cameras, it is often necessary for a surveillance camera to be mounted in a housing that is located in a remote or outdoor location such as the top of a pole, on a ledge, on the side of a wall, the underside of an eave, etc. Such locations often make it difficult for installation or service personnel to access the enclosure and the camera inside during both installation and maintenance. During installation, the camera must be properly positioned within the enclosure in order to operate correctly. In many cases, camera enclosures are relatively small leaving little room for adjustability. The camera lens must be positioned an appropriate distance from the viewing panel so that clear images are received, but this positioning should not crowd or unnecessarily bend the wires and cables leading from the camera or the related electronics. Excessively bent wires may break or fail and/or may reduce the rate of data transfer to and from the camera and electronics.

Traditionally, a surveillance camera is installed on a plate using a screw that is tightened through the plate into a receiving opening in the bottom of the camera. The plate with installed camera is then attached to a surface in the camera housing ordinarily using two or more additional screws. Only after the camera has been screwed to the plate, and the plate screwed to the housing is the installer able to determine whether the position of the camera on the plate is acceptable. If not, the plate must be unscrewed from the housing, and the camera unscrewed from the plate in order to adjust its position. In many cases, such camera mounting plates include a series of openings through which the camera mounting screw extends. If a given opening does not provide the correct position for the camera, another opening must be selected which could be as far as ¼ inch or ½ inch away from the initial opening. This may result in an over-adjustment of the position of the camera, which must be re-attached using a screw through the new opening in the plate, and the plate again attached with screws to the enclosure. This is a time-consuming, frustrating and inefficient process.

The same kinds of difficulties are encountered when an installed camera is replaced with a new or different camera. The lens and body of the new camera may be of a different length than the original camera, requiring the same cumbersome positioning process to be repeated for the new camera in the field. This process can become more cumbersome, frustrating and time-consuming if the camera is mounted in a location that is remote or difficult to access. Accessing such a camera may be further compounded if special tools are required to first open the enclosure and to then remove the camera.

Thus, when installing or servicing a surveillance camera in the field, it is desirable that a minimum number of tools be needed in order to gain access to the camera and electronics inside the enclosure. It is also desirable to provide a support structure for a surveillance camera that is easy to attach and remove, and that allows the position of the camera to be easily adjusted thereon.

Many existing camera housing enclosures include heating elements to help keep the front viewing panel clear of moisture on cold days. Such heating elements are generally deployed at the side(s), top and/or bottom of the viewing panel so that heat may readily reach the panel. However, positioning front panel heaters near the front panel itself takes up a considerable amount of the limited space inside the enclosure, and can interfere with the operation of the camera and electronics. During warm temperatures, surveillance cameras and their related electronics must not become excessively hot or their functionality will be affected, so it is important to be able to remove heat from the camera at such times It is therefore desirable to provide more efficient ways of keeping the front panel of a camera enclosure clear during cold temperature periods, and for providing efficient transfer of heat out of the camera enclosure during warm temperatures.

SUMMARY OF THE INVENTION

Embodiments of the present invention provide systems, methods and apparatus for supporting and easily adjusting the position of a surveillance camera in an enclosure. Embodiments of the present invention also provide systems, methods and apparatus for keeping the front panel of a camera enclosure clear during cold temperature periods. Finally, embodiments of the present invention also provide systems, methods and apparatus for efficient transfer of heat out of a camera enclosure during warm temperatures.

In one aspect of the present invention, embodiments of a camera mounting plate are provided having an elongated central opening therein. In embodiments of the invention, the opening or slot in the mounting plate receives a mounting screw used to attach a camera to the plate. The position of the camera on the plate may be adjusted by loosening the screw from the camera without disconnecting it, sliding the screw in the slot to move the camera to another location on the plate, and then tightening the screw. In some embodiments, the plate is made of plastic or other rigid material including metal. In other embodiments, the slot is provided in a metallic fitting that is installed flush with the top surface of the camera mounting plate. This allows for the plate itself to be made of non-metallic material. In some embodiments, the metallic fitting is formed so that a camera may be attached against an upper surface of the fitting, and the lower surface makes contact with a housing wall of the camera enclosure. In these embodiments, the metallic fitting may act as a conductor for transferring heat away from the camera to the housing wall and into the exterior environment.

In another aspect of the invention, embodiments of a camera mounting plate are provided that snap fit into place on a lower camera housing structure. In these embodiments, the plate is elongated, and has a pair of outwardly protruding knobs or buttons on each side at one end. A pair of clips are provided at the opposite end of the plate. The knobs on each side of the plate of these embodiments fit into or under correspondingly located slots or shoulders on the lower housing structure toward the rear. The end of the plate having the knobs thereon is inserted first into the rear of lower housing structure, with the knobs being inserted into such slots or under such shoulders. The plate then pivots around the knobs, allowing the opposite end of the plate to move through an arc until it comes into contact with the housing structure such that the opposite end of the plate is just behind the front viewing panel of the enclosure. At this point, the clips on either side of the opposite end of the plate snap into place against corresponding ridges or shoulders in the lower housing structure, securing the plate in place. In these embodiments, an upwardly extending tab is associated with each clip such that moving these tabs releases or disengages the clips from the ridge or shoulder to which they were engaged, allowing the plate to be removed. In some embodiments, the plate embodiments having the knobs and clips may also be provided with a slotted camera mounting opening as described herein, and/or such plate embodiments may also be provided with the metallic fitting as described herein.

In some of the snap-fit plate embodiments, the pivoting knobs may be provided at the ends of a pair of arms that extend out from the back of the plate. These arms provide a gap between them, and cause the location of the pivot point for the knobs to be closer to the back of the enclosure.

In some of the snap-fit plate embodiments, the clips are provided in the form of flexible arms located on both sides of the front portion of the plate. In these embodiments, each of these arms includes an outwardly extending lower flange or lip that snaps into place below a corresponding flange or shoulder on the lower housing structure. In these embodiments, upwardly extending tabs are provided on the flexible arms allowing the user to move the arms by moving the tabs. Such movement makes it possible to move the lower flanges or lips out from under the corresponding flange or shoulder of the lower housing structure, releasing the front end of the plate. It is to be appreciated that the clips of these embodiments may be provided through any suitable detachable mechanism.

In some embodiments of the present invention, one or more channels are provided in the lower surface of the support plate, extending from rear to front, leading to an opening at the front of the plate. When these embodiments of the plate are installed, this opening is located just below the front viewing panel of the enclosure. The channel(s) in the plate allow for direct communication of air from the rear of the housing to the front viewing plate. In these embodiments, one or more heating elements and a blower are provided at the rear of the housing. The heating element(s) and blower may be activated in order to cause warm air to flow through the channel(s) against the front plate to keep it clear of moisture in cold temperatures. The warm air evaporates moisture from the front viewing panel and front lens of the camera. The heating element may also be used to change or control the temperature inside the chamber.

It is therefore an object of the present invention to provide systems, methods and apparatus for supporting and easily adjusting the position of a surveillance camera in an enclosure.

It is also an object of the present invention to provide systems, methods and apparatus for keeping the camera lens and front panel of a camera enclosure clear during cold temperature periods.

It is also an object of the present invention to provide systems, methods and apparatus for efficient transfer of heat out of a camera enclosure during warm temperatures.

Additional objects of the invention will be apparent from the detailed descriptions and the claims herein.

DETAILED DESCRIPTION

Figure 1:
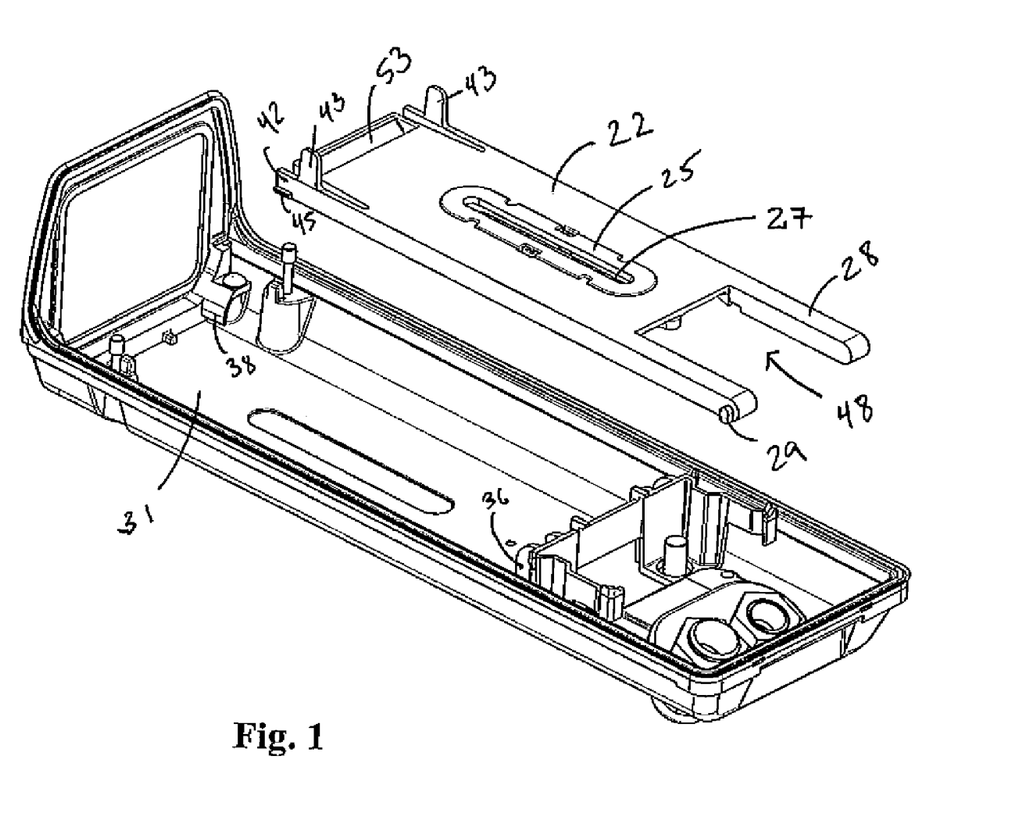
FIG. 1 is a top perspective exterior view of an embodiment of the present invention.
Figure 2:
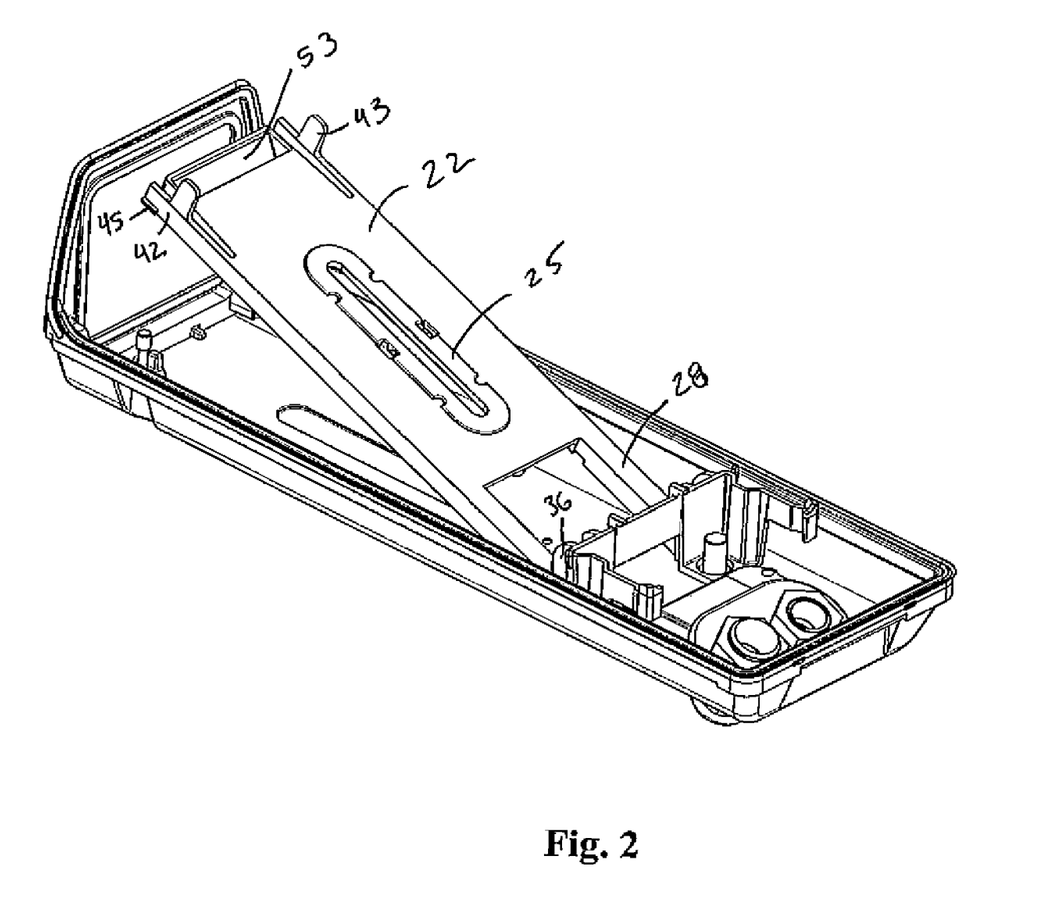
FIG. 2 is a top perspective exterior view of the embodiment of FIG. 1 partially installed in a housing.
Figure 3:
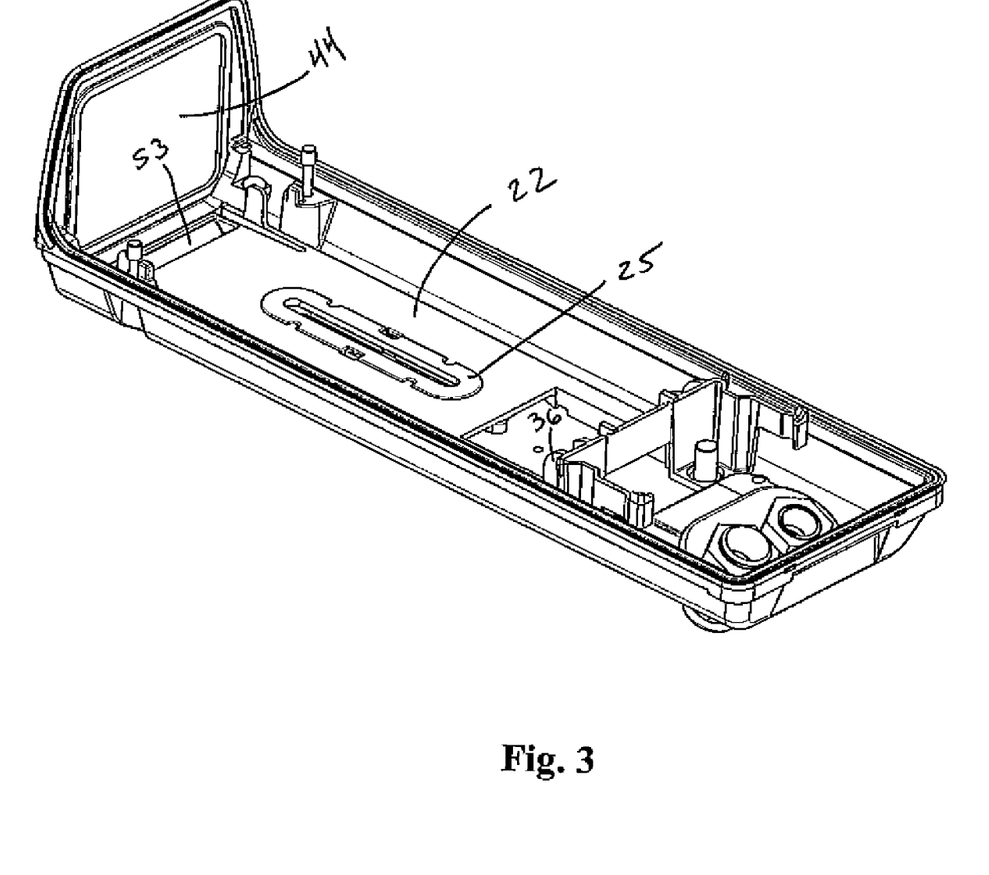
FIG. 3 is a top perspective exterior view of the embodiment of FIG. 1 fully installed in a housing.
Figure 4:
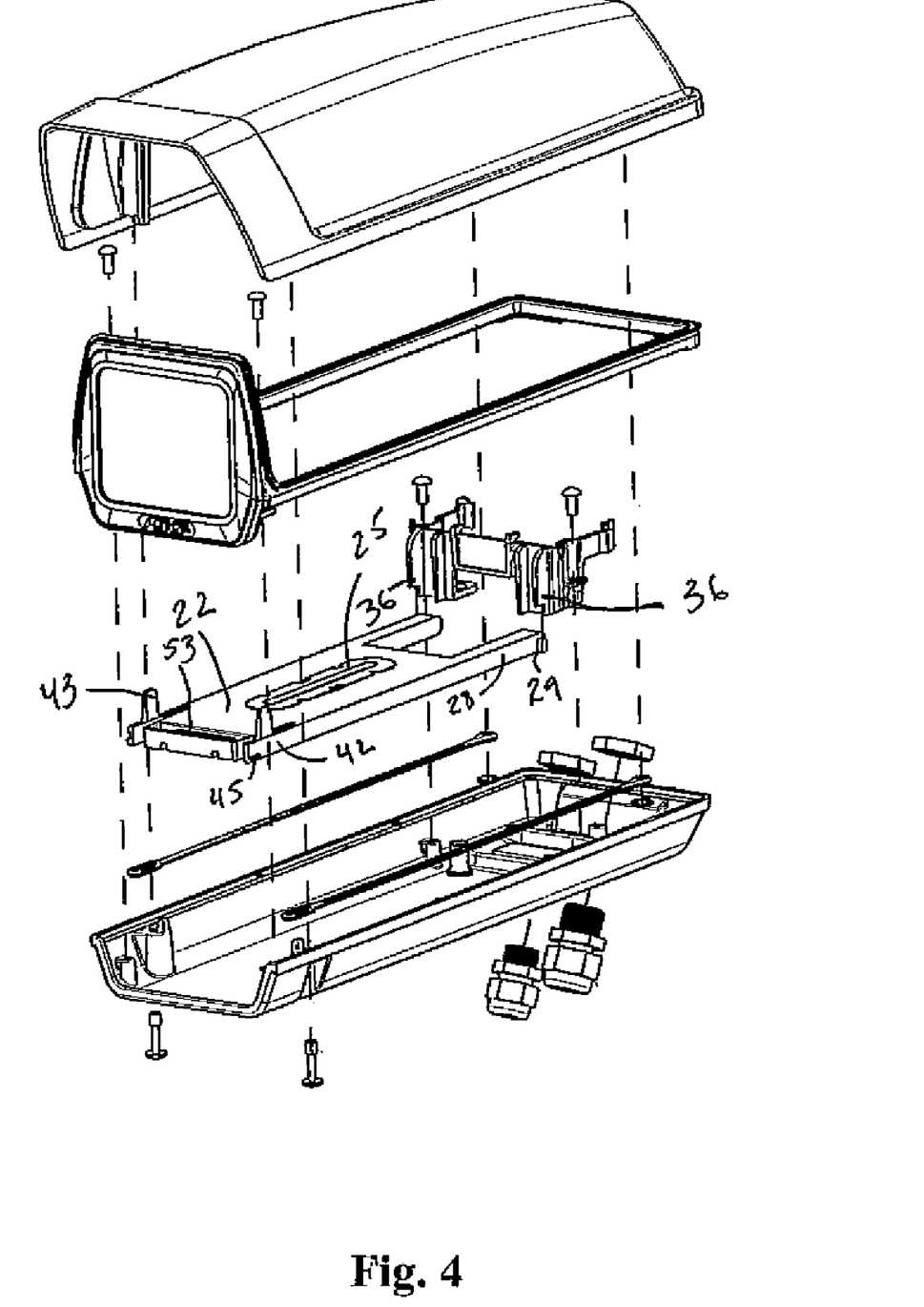
FIG. 4 is an exploded view of an embodiment of the invention and a camera housing.
Figure 5:
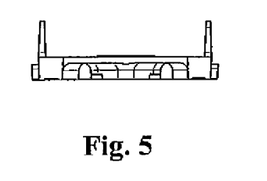
FIG. 5 is an end view of an embodiment of the present invention.
Figure 6:
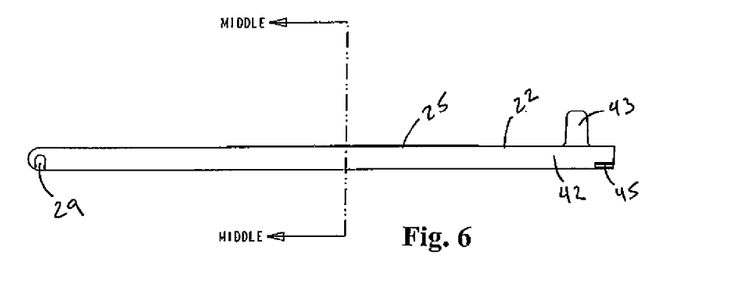
FIG. 6 is a side view of the embodiment of FIG. 5.
Figure 7:
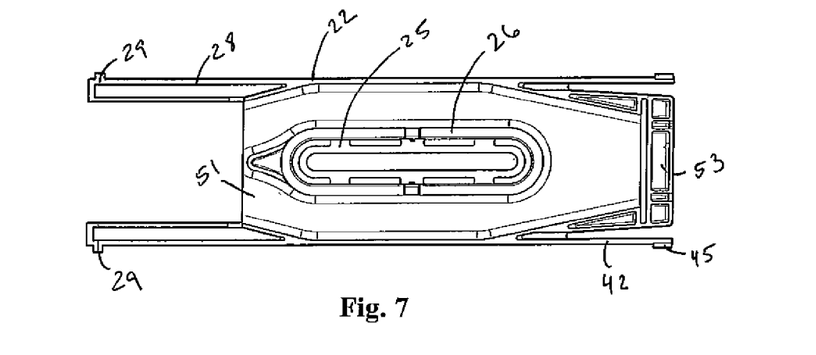
FIG. 7 is a bottom view of the embodiment of FIG. 5.
Figure 8:
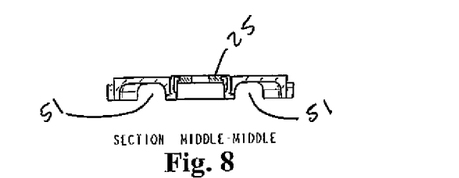
FIG. 8 is an end sectional view along the line labeled "middle" of FIG. 6.
Figure 9:
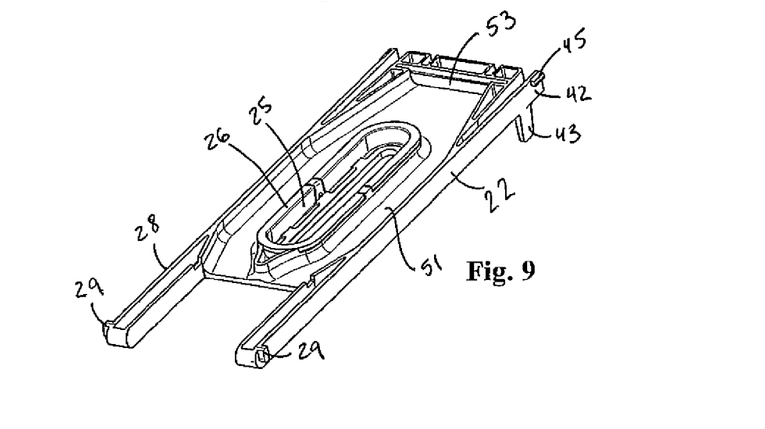
FIG. 9 is a bottom perspective view of the embodiment of FIG. 5.
Figure 10:
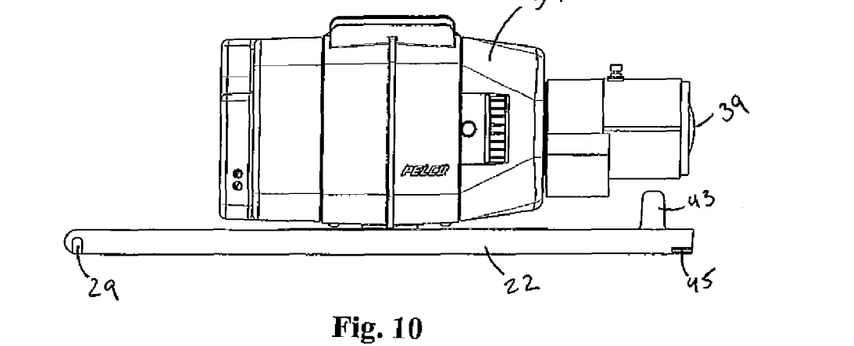
FIG. 10 is a side view of an embodiment of the present invention supporting a camera.
Figure 11:
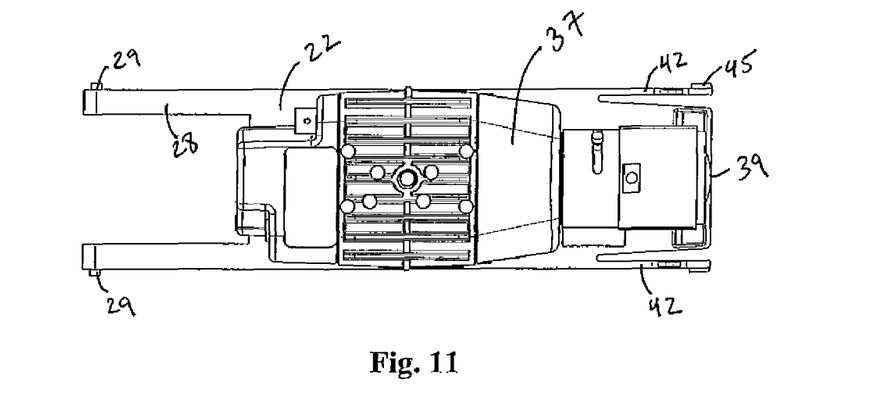
FIG. 11 is a top view of the embodiment of FIG. 10.
Figure 12:
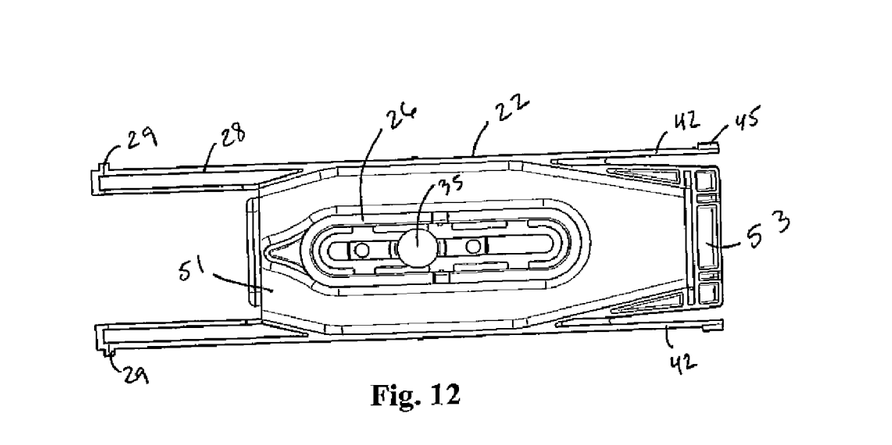
FIG. 12 is a bottom view of the embodiment of FIG. 10.
Figures 13, 14:
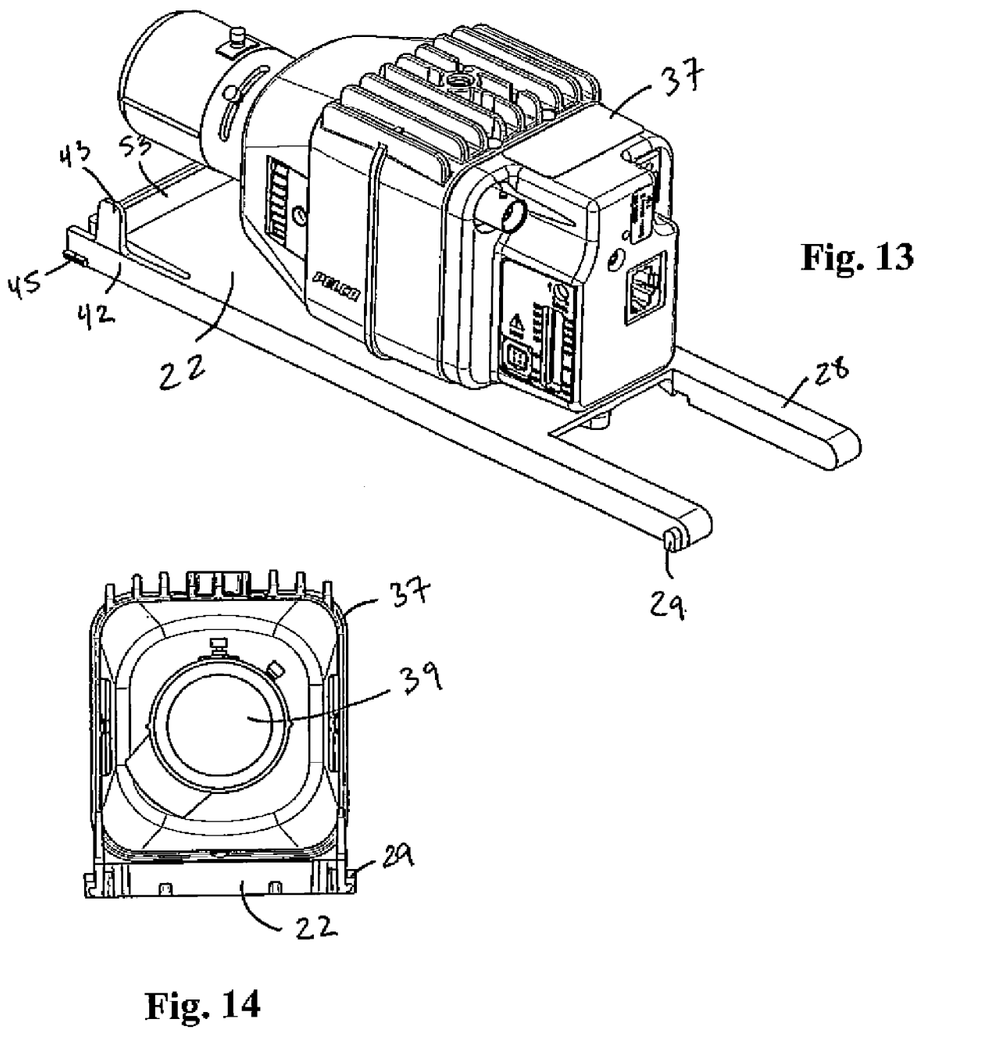
FIG. 13 is a perspective view of the embodiment of FIG. 10.
FIG. 14 is an end view of the embodiment of FIG. 10.

Referring to the drawings wherein like reference characters designate like or corresponding parts throughout the several views, and referring particularly to FIGS. 1-3, it is seen that the illustrated exemplary embodiment of the present invention includes a generally rectangular plate 22 having a central opening therein. In the illustrated embodiments, a fitting 25 is inserted into the opening such that it is flush with the upper surface of plate 22 as shown in FIG. 6. Fitting 25 is preferably made of a temperature-conductive material such as metal. An elongated slot 27 is provided in fitting 25 extending a distance from front to rear along plate 22. It is to be appreciated that in alternative embodiments fitting 25 may be omitted and slot 27 may be provided directly on plate 22 (not shown).

In the illustrated exemplary embodiments of the invention, slot 27 receives a mounting screw 35 used to attach a camera 37 to the plate 22 as shown in FIGS. 10-14. The position of the camera on the plate may be adjusted by loosening the screw 35 from the camera 37 without disconnecting it, sliding the screw 35 in slot 27 to move the camera to another location on plate 22, and then re-tightening the screw.

In the illustrated exemplary embodiments of the invention, the fitting 25 is metallic, and is formed so that a camera 37 may be attached against its upper surface, and the lower surface 26 of fitting 25 makes contact with a housing wall 31 of the camera enclosure. In these embodiments, the metallic fitting 25 may act as a conductor for transferring heat away from the camera 37 to the housing wall 31 and into the exterior environment.

In the illustrated exemplary embodiments of the invention, plate 22 has an elongated shape, and has a pair of outwardly protruding knobs or buttons 29 on each side at the rear end. A pair of clips 42 are provided at the opposite end of plate 22. The knobs 29 on each side of plate 22 of the illustrated embodiments fit into or under correspondingly located slots or shoulders 36 on the lower housing structure 31 toward the rear. The back end of plate 22 is inserted first into the rear of lower housing structure 31, with the knobs being inserted into such slots or under such shoulders, as shown in FIG. 2. The plate 22 then pivots around knobs 29, allowing the opposite end of plate 22 to move through an arc until it comes into contact with the housing structure 31 such that the front end of plate 22 is just behind the front viewing panel 44 of the enclosure, as shown in FIG. 3. At this point, the clips 42 on either side of the front end of plate 25 snap into place against corresponding ridges or shoulders 38 in the lower housing structure 31, securing the plate 22 in place. In the illustrated embodiments, an upwardly extending tab 43 is associated with each clip 42 for manipulation purposes such that moving tab 43 releases or disengages the clip 42 from the ridge or shoulder 38 to which they were engaged, allowing plate 22 to be removed. In the illustrated embodiments, a plate 22 having the knobs 29 and clips 42 is also be provided with a slotted camera mounting opening 27 and metallic fitting 25. It is to be appreciated that these features may be separated from each other and provided independently or in different combinations in different embodiments of the invention.

In the illustrated exemplary embodiments, the pivoting knobs 29 are provided at the ends of a pair of arms 28 that extend out from the back of plate 22. Arms 28 provide a gap 48 between them, and cause the location of the pivot point for the knobs 29 to be closer to the back of the enclosure. It is to be appreciated that in the embodiments having arms 28, knobs 29 may protrude inward, or outward (as shown), or in both directions.

In some embodiments, the clips are provided in the form on flexible arms 42 located on both sides of the front portion of plate 22. In these embodiments, each of these arms 42 is urged in an outward direction, and includes an outwardly extending lower flange or lip 45 that snaps into place below a corresponding flange or shoulder 38 on the lower housing structure, in alternative embodiments (not shown), arms 42 may be urged in an inward direction, and may include an inwardly extending lower flange or lip 45 that snaps into place below a corresponding flange or shoulder 38 on the lower housing structure, in these embodiments, upwardly extending tabs 43 are provided on the flexible arms 42 to allow the user to move the arms 42 by moving the tabs 43. Such movement makes it possible to move the lower flanges or lips 45 out from under the corresponding flange or shoulder 38 of the lower housing structure 31, releasing the front end of plate 22, as shown in FIG. 2. It is to be appreciated that the clips used to hold the front of plate 22 into housing 31 may be provided through any suitable detachable mechanism.

In embodiments of the present invention, one or more channels 51 are provided in the lower surface of the support plate 22, extending from rear to front, leading to an opening 53 at the front of the plate. See FIGS. 5-9. When these embodiments of the plate are installed, opening 53 is located just below the front viewing panel 44 of the enclosure. The channel(s) 51 in the lower surface of plate 22 allow for direct communication of air from the rear of the housing to the front viewing plate 44. In these embodiments, one or more heating elements and a blower (not shown) are provided at the rear of the housing. The heating element(s) and blower may be activated in order to cause warm air to flow through the channel (s) 51 against the front plate 44 to keep it clear of moisture in cold temperatures. The warm air evaporates moisture from the front viewing panel 44 and front lens 39 of the camera 37. The heating element and blower in conjunction with channels 51 and opening 53 may also be used to change or control the temperature inside the chamber.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A structure for supporting a camera comprising: a housing having an upper portion and a lower portion, said lower portion having a front end and a rear end and having a first pair of receiving structures located proximate said rear end and a second pair of receiving structures located proximate said front end; and a plate member having a body, an upper surface, a lower surface, a front end, a rear end and opposite sides, said plate member having a narrow slot extending a distance from front to back to allow a fastener to be inserted through the slot and engaged with an aperture in a camera so that a camera can be attached to the upper surface of said plate member at a desired location along said slot, said plate member having a pair of protruding knobs provided on opposite sides of said plate member proximate the rear end of said plate member and a pair of clips provided on opposite sides of said plate member proximate the front end of said plate member, wherein said first pair of receiving structures allows engagement of said protruding knobs so that said rear end of said plate member is secured to said lower portion of said housing and said front end of said plate member can pivot into position so that said pair of clips securely engage with said second pair of receiving structures, thereby allowing a user to install the plate member into said housing without the use of tools.

2. The support structure of claim 1 wherein a pair of rearwardly extending arms are provided on opposite sides of said plate member at the rear end of said plate member, each arm having a protruding knob thereon for movable engagement with a said first pair of receiving structures on said lower portion of said housing.

3. The support structure of claim 2 wherein a pair of movable arms are provided on opposite sides of said plate member at the front end, each such arm having a lip thereon for secure engagement with said second pair of receiving structures on said lower portion of said housing.

4. The support structure of claim 3 wherein a manipulation tab is provided on each of said movable arms.

5. The support structure of claim 1 wherein a pair of movable arms are provided on opposite sides of said plate member at the front end, each such arm having a lip thereon for secure engagement with said second pair of receiving structures on said lower portion of said housing.

6. The support structure of claim 5 wherein a manipulation tab is provided on each of said movable arms.

7. The support structure of claim 1 wherein said plate member has a second opening near the front of said body extending from said lower surface to said upper surface and a channel in said lower surface for fluid communication between said second opening and a heat source at the rear of said housing.

8. A structure for supporting a camera comprising: a housing having an upper portion and a lower portion, said lower portion having a wall; and a removable plate member having a body, an upper surface and a lower surface, said plate member having a metallic fitting in said body, said metallic fitting having a slot extending a distance from front to back of said plate member to allow the attachment of a camera to said plate member and said metallic fitting being flush with the upper surface of said plate member and extending below the surface of said lower surface so that said metallic fitting makes contact with said wall of said lower portion of said housing when said plate member is positioned inside said housing thereby removing heat from a camera attached to said plate member so that heat generated by a camera attached to said body is transferred to said metallic fitting and from said metallic fitting to said wall in said lower portion of said housing.

9. The support structure of claim 8 wherein a pair of protruding knobs are provided on opposite sides of said plate at the rear end for movable engagement with a corresponding pair of receiving structures on said housing.

10. The support structure of claim 8 wherein a pair of rearwardly extending arms are provided on opposite sides of said plate at the rear, each arm having a protruding knob thereon for movable engagement with a corresponding pair of receiving structures on said housing.

11. The support structure of claim 8 wherein a pair of clips are provided on opposite sides of said plate at the front for secure engagement with other receiving structures on said housing.

12. The support structure of claim 8 wherein a pair of movable arms are provided on opposite sides of said plate at the front, each such arm having a lip thereon for secure engagement with other receiving structures on said housing.

13. The support structure of claim 12 wherein a manipulation tab is provided on each of said movable arms.

14. The support structure of claim 8 wherein said plate member has a second opening near the front of said body extending from said lower surface to said upper surface and a channel in said lower surface for fluid communication between said second opening and a heat source at the rear of said housing.

15. The support structure of claim 14 wherein said metallic fitting creates at least two channels in said lower surface for fluid communication between said second opening and a heat source at the rear of said housing.

* * * * *